United States Patent [19]
Maeda et al.

[11] Patent Number: 6,080,693
[45] Date of Patent: *Jun. 27, 2000

[54] INSULATING CERAMIC COMPOSITION AND CERAMIC INDUCTOR USING THE SAME

[75] Inventors: Eiichi Maeda; Katsuhisa Imada, both of Yokaichi; Motoi Nishii, Omihachiman; Yoshihiro Nishinaga, Hikone; Takashi Kobayashi, Omihachiman, all of Japan

[73] Assignee: Murata Manufacturing Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 09/030,050

[22] Filed: Feb. 24, 1998

[30] Foreign Application Priority Data

Feb. 28, 1997 [JP] Japan ................................. 9-045885

[51] Int. Cl.$^7$ ..................................................... C04B 35/14
[52] U.S. Cl. ................................ 501/55; 501/133; 252/62
[58] Field of Search ................................ 252/62; 501/55, 501/59, 61, 62, 133

[56] References Cited

U.S. PATENT DOCUMENTS

| | | | |
|---|---|---|---|
| 3,957,499 | 5/1976 | DeMunn et al. | 501/61 |
| 3,970,465 | 7/1976 | Houben | 501/62 |
| 4,562,161 | 12/1985 | Menneman et al. | 501/59 |
| 5,077,240 | 12/1991 | Hayden et al. | 501/55 |
| 5,622,903 | 4/1997 | Rapp et al. | 501/35 |

OTHER PUBLICATIONS

Patent Abstracts of Japan; vol. 016, No. 172 (C–0933), Apr. 24, 1992 & JP 04 16551 A (Murata Manufacturing Co., Ltd.), 21 (Jan. 1992).

*Primary Examiner*—Paul Marcantoni
*Attorney, Agent, or Firm*—Ostrolenk, Faber, Gerb & Soffen, LLP

[57] ABSTRACT

An insulating ceramic composition which comprises about 62–75 wt % of silicon oxide (in terms of $SiO_2$), about 4–22 wt % of barium oxide (in terms of $BaCO_3$), about 0.5–2.5 wt % of aluminum oxide (in terms $Al_2O_3$), 0 to about 0.8 wt % of chromium oxide (in terms of $Cr_2O_3$), about 0.2–0.8 wt % of calcium oxide (in terms of $CaCO_3$), about 8–18 wt % of boron oxide (in terms of $B_2O_3$), and 0 to about 2.5 wt % of potassium oxide (in terms of $K_2O$). A ceramic inductor is made of said insulating ceramic composition.

6 Claims, 1 Drawing Sheet

INSULATING CERAMIC COMPOSITION AND CERAMIC INDUCTOR USING THE SAME

BACKGROUND OF THE INVENTION

1. Field of the invention

The present invention relates to a ceramic composition, particularly to an insulating ceramic composition and a ceramic inductor using the same.

2. Description of the Prior Art

The miniaturization of electronic machines and equipment is generally realized by the use of ceramic substrates on which are mounted electronic parts to constitute electric circuits. Efforts to increase the mounting density further are being directed to the development of multilayer ceramic substrates which contain internal circuits and electronic circuit components, such as capacitors and inductors. The multilayer ceramic substrates are often made of aluminium oxide (alumina). Having a sintering temperature as high as 1500–1600° C., alumina needs a large amount of energy for firing. In addition, alumina necessitates the internal conductors to be made of high-melting materials, such as tungsten and molybdenum, which can endure the firing of the alumina. The result is a high resistance in the internal circuits which limits the current capacity.

There is proposed a material for substrates which sinters at low temperatures in JP-A-4-16551. The ceramic composition composed mainly of $SiO_2$. The ceramic composition can be fired at comparatively low temperatures ranging from 940° C. to 1000° C., which permits internal conductors to be made of copper. Unfortunately, copper needs a reducing or non-oxidizing firing atmosphere. This disadvantage can be eliminated by replacing copper with silver which is resistant to oxidation in the air at high temperatures. Silver, however, makes it necessary to fire the ceramic composition at temperatures lower than 900° C.

OBJECT AND SUMMARY OF THE INVENTION

It is an object of the present invention to provide an insulating ceramic composition which permits firing at temperatures lower than about 900° C. with a broad range of optimum firing temperatures and yields a ceramic product having a high insulation resistance and a low dielectric constant. It is another object of the present invention to provide a ceramic inductor made of said ceramic composition.

The first aspect of the present invention resides in an insulating ceramic composition which comprises about 62–75 wt % of silicon oxide (in terms of $SiO_2$), about 4–22 wt % of barium oxide (in terms of $BaCO_3$), about 0.5–2.5 wt % of aluminum oxide (in terms $Al_2O_3$), 0 to about 0.8 wt % of chromium oxide (in terms of $Cr_2O_3$), about 0.2–0.8 wt % of calcium oxide (in terms of $CaCO_3$), about 8–18 wt % of boron oxide (in terms of $B_2O_3$) and 0 to about 2.5 wt % of potassium oxide (in terms of $K_2O$).

The second aspect of the present invention resides in a ceramic inductor of the type having a ceramic sintered body, an internal conductor formed as an inductor in said ceramic sintered body, and external electrodes which are formed on the end surfaces of said ceramic sintered body and electrically connected to said internal conductor, wherein said ceramic sintered body comprises about 62–75 wt % of silicon oxide (in terms of $SiO_2$), about 4–22 wt % of barium oxide (in terms of $BaCO_3$) about 0.5–2.5 wt % of aluminum oxide (in terms $Al_2O_3$), 0 to about 0.8 wt % of chromium oxide (in terms of $Cr_2O_3$), about 0.2–0.8 wt % of calcium oxide (in terms of $CaCO_3$), about 8–18 wt % of boron oxide (in terms of $B_2O_3$), and 0 to about 2.5 wt % of potassium oxide (in terms of $K_2O$).

DESCRIPTION OF THE PREFERRED EMBODIMENTS

Figure 1:
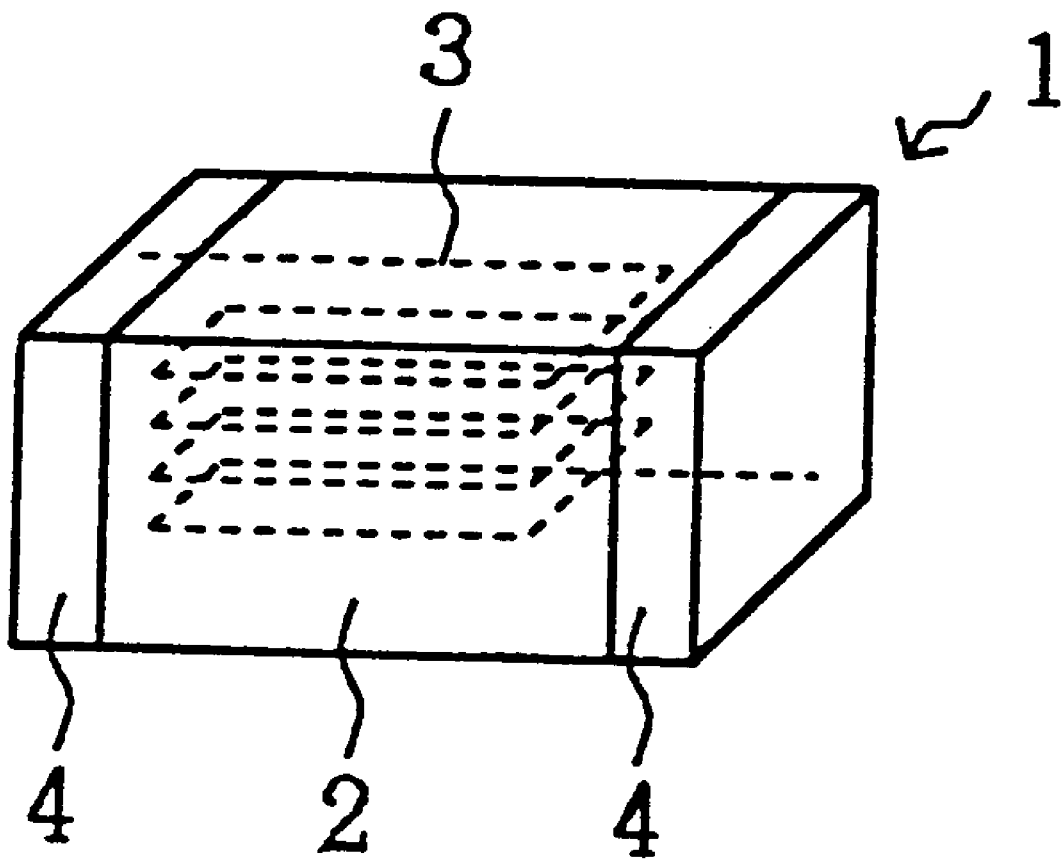
FIG. 1 is a perspective view showing one embodiment of the ceramic inductor pertaining to the present invention.

The invention will be explained with reference to the following examples.

EXAMPLE 1

There were mixed together silicon oxide, barium carbonate, aluminum oxide, chromium oxide, calcium carbonate, boron oxide, and potassium oxide (as starting materials) in the ratios shown in Table 1. The resulting mixture was crushed by the wet process using a ball mill, followed by dehydration, drying, and calcination at 800–900° C. The calcined powder was crushed again by the wet process using a ball mill to give a prepared powder.

TABLE 1

| Sample No. | $SiO_2$ (wt %) | $BaCO_3$ (wt %) | $Al_2O_3$ (wt %) | $Cr_2O_3$ (wt %) | $CaCO_3$ (wt %) | $B_2O_3$ (wt %) | $K_2O_3$ (wt %) | Optimum firing temperature (° C.) | Range of optimum firing temperatures (± ° C.) | Dielectric Constant ($\epsilon$) | Insulation resistance ($\Omega \cdot cm$) | Flexural strength ($kg/cm^2$) |
|---|---|---|---|---|---|---|---|---|---|---|---|---|
| 1* | 60 | 20 | 1.8 | 0.6 | 0.4 | 16 | 1.2 | 850 | 20 | 6.5 | 12.3 | 1180 |
| 2* | 62 | 24 | 1.8 | 0.6 | 0.4 | 10 | 1.2 | 880 | 16 | 6.2 | 11.8 | 1120 |
| 3 | 62 | 18 | 1.8 | 0.6 | 0.4 | 16 | 1.2 | 850 | 22 | 5.9 | 12.6 | 1060 |
| 4 | 64 | 18 | 1.8 | 0.6 | 0.4 | 14 | 1.2 | 860 | 18 | 5.7 | 12.8 | 1180 |
| 5 | 66 | 14 | 1.8 | 0.6 | 0.4 | 16 | 1.2 | 850 | 24 | 5.4 | 12.8 | 1180 |
| 6* | 66 | 14 | 1.8 | 1.0 | 0.2 | 16 | 1.0 | 850 | 18 | 5.6 | 9.3 | 1150 |
| 7* | 66 | 14 | 0.3 | 0.4 | 1.3 | 16 | 2.0 | 910 | 17 | 5.8 | 11.2 | 920 |
| 8* | 66 | 14 | 0.5 | 0.5 | 0.4 | 16 | 2.6 | 860 | 24 | 5.6 | 9.5 | 1130 |
| 9 | 66 | 14 | 0.7 | 0.6 | 0.7 | 16 | 2.0 | 850 | 25 | 5.4 | 10.3 | 1080 |
| 10 | 66 | 14 | 1.8 | 0.4 | 0.6 | 16 | 1.2 | 850 | 22 | 5.8 | 11.8 | 1120 |
| 11 | 66 | 14 | 2.0 | 0.7 | 0.7 | 16 | 0.6 | 850 | 18 | 5.8 | 12.6 | 1180 |
| 12* | 66 | 14 | 2.0 | 0.6 | 0.1 | 16 | 1.3 | 860 | 13 | 5.6 | 11.8 | 1150 |
| 13 | 66 | 14 | 2.2 | 0 | 0.6 | 16 | 1.2 | 860 | 20 | 5.4 | 12.8 | 1160 |
| 14 | 66 | 14 | 2.4 | 0.8 | 0.8 | 16 | 0 | 880 | 20 | 5.5 | 13.3 | 1150 |

TABLE 1-continued

| Sample No. | SiO$_2$ (wt %) | BaCO$_3$ (wt %) | Al$_2$O$_3$ (wt %) | Cr$_2$O$_3$ (wt %) | CaCO$_3$ (wt %) | B$_2$O$_3$ (wt %) | K$_2$O (wt %) | Optimum firing temperature (° C.) | Range of optimum firing temperatures (± ° C.) | Dielectric Constant (ε) | Insulation resistance (Ω · cm) | Flexural strength (kg/cm$^2$) |
|---|---|---|---|---|---|---|---|---|---|---|---|---|
| 15* | 66 | 14 | 2.7 | 0.2 | 0.6 | 16 | 0.5 | 920 | 16 | 6.5 | 12.6 | 1180 |
| 16 | 68 | 20 | 1.8 | 0.6 | 0.4 | 8 | 1.2 | 880 | 20 | 5.2 | 11.8 | 1130 |
| 17 | 70 | 8 | 1.8 | 0.6 | 0.4 | 18 | 1.2 | 860 | 24 | 5.2 | 13.5 | 1200 |
| 18 | 72 | 10 | 0.5 | 0.1 | 0.2 | 17 | 0.2 | 870 | 22 | 5.1 | 11.8 | 1280 |
| 19 | 72 | 16 | 0.5 | 0.5 | 0.5 | 10 | 0.5 | 900 | 20 | 5.0 | 12.2 | 1350 |
| 20* | 73 | 3 | 1.8 | 0.6 | 0.4 | 20 | 1.2 | 920 | 15 | 5.0 | 9.8 | 820 |
| 21 | 74 | 6 | 1.8 | 0.6 | 0.4 | 16 | 1.2 | 900 | 20 | 4.8 | 11.7 | 980 |
| 22 | 78 | 12 | 1.8 | 0.6 | 0.4 | 6 | 1.2 | 930 | 13 | 5.1 | 12.2 | 1150 |

The prepared powder was mixed with water or organic solvent (as a binder) to give a slurry, which was subsequently formed into a green sheet (1 mm thick) by the doctor blade process. The green sheet was cut into square pieces (10 mm by 10 mm). Both surfaces of each piece were coated by printing with silver paste composed of silver powder and organic vehicle in the ratio of 80:20 by weight. The coated pieces were fired in the air at 850–950° C. for 90 minutes.

The samples obtained as mentioned above were tested for their characteristic properties. Dielectric constant and insulation resistance were measured with an impedance analyzer and IR meter, and flexural strength was measured with a strength tester.

Dielectric constant (ε) was calculated from electrostatic capacity (C) which was measured with an automatic bridge tester at 1 kHz, 1 V$_{rms}$ and 25° C. Insulation resistance (R) was measured with an insulation resistance tester by application of 16 V dc for 2 minutes at 25° C. Flexural strength was measured by the 3-point bending method and calculated according to JIS. The results are shown in Table 1.

The optimum firing temperature shown in Table 1 is the firing temperature at which the maximum shrinkage is reached. (Shrinkage is due to sintering and evaporation of binder which occurs as the temperature increases.) The range of optimum firing temperatures shown in Table 1 is the difference between the limits above and below the above-mentioned optimum firing temperature, with the lower limit being the temperature at which shrinkage is greater by 0.5% than that at the optimum firing temperature, and the upper limit being the temperature at which the sample begins to become poor in solderability.

To test solderability, the sample was dipped in a lead-solder bath at 230±10° C. for 2 seconds after preheating at 150° C. for 20 seconds, with the silver electrode coated with a chloride-based flux. Solderability was rated by visual observation as good if more than 90% of the surface of the silver electrode was covered with solder; otherwise, it was rated as poor. Incidentally, samples not conforming to the present invention are marked with an asterisk in Table 1.

According to the present invention, the insulating ceramic composition is restricted in the ratio of its components for the reasons given below.

With SiO$_2$ less than about 62 wt %, the sample has a dielectric constant greater than 6, which adversely affects the characteristic properties of the electronic circuit for high frequencies, as in Sample No. 1.

With SiO$_2$ more than about 75 wt %, the sample needs firing at temperatures higher than 900° C., as in Sample No. 22.

With BaCO$_3$ less than about 4 wt %, the sample has a low flexural strength of 820 kg/cm$^2$ and needs firing at temperatures higher than 900° C., as in Sample No. 20.

With BaCO$_3$ more than about 22 wt %, the sample has a dielectric constant greater than 6, as in Sample No. 2.

With Al$_2$O$_3$ less than about 0.5 wt %, as in Sample No. 7, or with Al$_2$O$_3$ more than about 2.5 wt %, as in Sample No. 15, the sample needs firing at temperatures higher than 900° C.

With Cr$_2$O$_3$ more than about 0.8 wt %, the sample is low in insulation resistance, as in Sample No. 6.

With less than about 0.2 wt %, the sample has a narrow range (less than 15° C.) of optimum firing temperatures.

With CaCO$_3$ more than about 0.8 wt %, the sample needs firing at temperatures higher than 900° C., as in Sample No. 7.

With B$_2$O$_3$ less than about 8 wt %, the sample needs firing at temperatures higher than 900° C., as in Sample No. 22.

With B$_2$O$_3$ more than about 18 wt %, the sample is low in insulation resistance, as in Sample No. 20.

With K$_2$O more than about 2.5 wt %, the sample is low in insulation resistance, as in Sample No. 8.

The silver for the electrodes in this example may be replaced by silver alloy, such as a silver-palladium alloy.

EXAMPLE 2

This example demonstrates a ceramic inductor made of the ceramic composition in Example 1.

The slurry prepared in Example 1, sample 10, was made into a green sheet by the doctor blade process. On one surface of the green sheet a conductor pattern was formed by printing an electrically conductive paste of silver-palladium alloy such that when printed green sheets are placed one over another, the conductor pattern constitutes a coiled conductor within the laminate through via holes in them. The laminate of green sheets was fired in the air at 860° C. for 1 hour to give a bisquet.

On the end surface of the bisquet was formed an external electrode composed of a first layer of amalgam plated silver, a second layer of electroplated nickel, and a third layer of plated tin. The external electrode was electrically connected to the internal coiled conductor.

FIG. 1 is a perspective view of one embodiment of the ceramic inductor obtained as mentioned above. In FIG. 1, there are shown the ceramic inductor 1, the insulating ceramic 2, the internal coiled conductor 3, and the external electrode 4. The insulating ceramic (bisquet) is made of the SiO$_2$—BaO—B$_2$O$_3$ insulating ceramic composition of the present invention.

Since the ceramic composition is capable of firing at low temperatures, the internal conductor can be made of a silver-rich alloy having a high conductivity. Therefore, the resulting chip-type ceramic inductor is suitable for use in the high-frequency range.

The material used to form the internal conductor pattern on the ceramic sheet surface may be silver or silver alloy such as silver-palladium alloy. The method for pattern forming may be any of printing, coating, vapor deposition, and sputtering.

The material used to form the external electrode may be not only silver (mentioned above) but also silver-palladium alloy or such metals (or alloy thereof) as nickel and copper. Printing, vapor deposition, or sputtering may be employed to form the external electrode. The external electrode formed on the end surface of the laminate may be fired simultaneously with the firing of the laminate.

The ceramic inductor 1 is not specifically restricted in shape. In addition, the coil is not specifically restricted to any particular number of turns. Any desired number of turns may be established by properly selecting the number of insulating ceramic layers 2 carrying the internal conductor pattern.

Although this example demonstrates a ceramic inductor having one inductor, the same idea may be applied to composite components of ceramic inductors such as transformers and LC filters.

The insulating ceramic composition of the present invention is capable of firing in the air at temperatures lower than about 900° C. It has such a broad range of optimum firing temperature that it yields good products even when the temperature fluctuates in a batch furnace or continuous firing furnace. Therefore, it is suitable for commercial mass production. The insulating ceramic composition of the present invention also yields a ceramic product having a high insulation resistance, a low dielectric constant and a high flexural strength.

The ceramic inductor of the present invention can have an internal conductor of silver or silver alloy because it is made of the insulating ceramic composition of the present invention. The ceramic inductor of the present invention has a high self-resonance frequency and a high Q (quality factor).

What is claimed is:

1. An unsintered insulating ceramic composition which comprises:

62–75 wt % of silicon oxide calculated as $SiO_2$, about 4–22 wt % of barium oxide calculated as $BaCO_3$, about 0.5–2.5 wt % of aluminum oxide calculated as $Al_2O_3$, 0.1 to about 0.8 wt % of chromium oxide calculated as $Cr_2O_3$, about 0.2–0.8 wt % of calcium oxide calculated as $CaCO_3$, about 8–18 wt % of boron oxide calculated as $B_2O_3$, and 0 to about 2.5 wt % of potassium oxide calculated as $K_2O$.

2. An unsintered insulating ceramic composition according to claim 1 which comprises:

64–70 wt % of silicon oxide calculated as $SiO_2$, about 12–20 wt % of barium oxide calculated as $BaCO_3$, about 0.4–2.4 wt % of aluminum oxide calculated as $Al_2O_3$, 0.1 to about 0.7 wt % of chromium oxide calculated as $Cr_2O_3$, about 0.4–0.7 wt % of calcium oxide calculated as $CaCO_3$, about 10–16 wt % of boron oxide calculated as $B_2O_3$, and about 0.2–2 wt % of potassium oxide calculated as $K_2O$.

3. A sintered insulating ceramic composition which comprises:

about 62–75 wt % of silicon oxide calculated as $SiO_2$, about 4–22 wt % of barium oxide calculated as $BaCO_3$, about 0.5–2.5 wt % of aluminum oxide calculated as $Al_2O_3$, 0 to about 0.8 wt % of chromium oxide calculated as $Cr_2O_3$, about 0.2–0.8 wt % of calcium oxide calculated as $CaCO_3$, about 8–18 wt % of boron oxide calculated as $B_2O_3$, and 0 to about 2.5 wt % of potassium oxide calculated as $K_2O$.

4. An sintered insulating ceramic composition according to claim 3 which comprises:

64–70 wt % of silicon oxide calculated as $SiO_2$, about 12–20 wt % of barium oxide calculated as $BaCO_3$, about 0.4–2.4 wt % of aluminum oxide calculated as $Al_2O_3$, 0.1 to about 0.7 wt % of chromium oxide calculated as $Cr_2O_3$, about 0.4–0.7 wt % of calcium oxide calculated as $CaCO_3$, about 10–16 wt % of boron oxide calculated as $B_2O_3$, and about 0.2–2 wt % of potassium oxide calculated as $K_2O$.

5. In an inductor comprising a sintered ceramic body, an internal conductor in said ceramic sintered body, and an external electrode on an end surface of said ceramic sintered body and electrically connected to said internal conductor, the improvement wherein said ceramic sintered body comprises:

about 62–75 wt % of silicon oxide calculated as $SiO_2$, about 4–22 wt % of barium oxide calculated as $BaCO_3$, about 0.5–2.5 wt % of aluminum oxide calculated as Al2O3, 0 to about 0.8 wt % of chromium oxide calculated as $Cr_2O_3$, about 0.2–0.8 wt % of calcium oxide calculated as $CaCO_3$, about 8–18 wt % of boron oxide calculated as $B_2O_3$, and 0 to about 2.5 wt % of potassium oxide calculated as $K_2O$.

6. The inductor according to claim 5 in which said sintered ceramic body comprises:

64–70 wt % of silicon oxide calculated as $SiO_2$, about 12–20 wt % of barium oxide calculated as $BaCO_3$, about 0.4–2.4 wt % of aluminum oxide calculated as Al2O3, 0.1 to about 0.7 wt % of chromium oxide calculated as $Cr_2O_3$, about 0.4–0.7 wt % of calcium oxide calculated as $CaCO_3$, about 10–16 wt % of boron oxide calculated as $B_2O_3$, and about 0.2–2 wt % of potassium oxide calculated as $K_2O$.

\* \* \* \* \*